Feb. 5, 1946. H. C. MORGAN 2,394,196
MULTISCALE INSTRUMENT INDICATING SYSTEM
Filed July 9, 1943 3 Sheets-Sheet 1
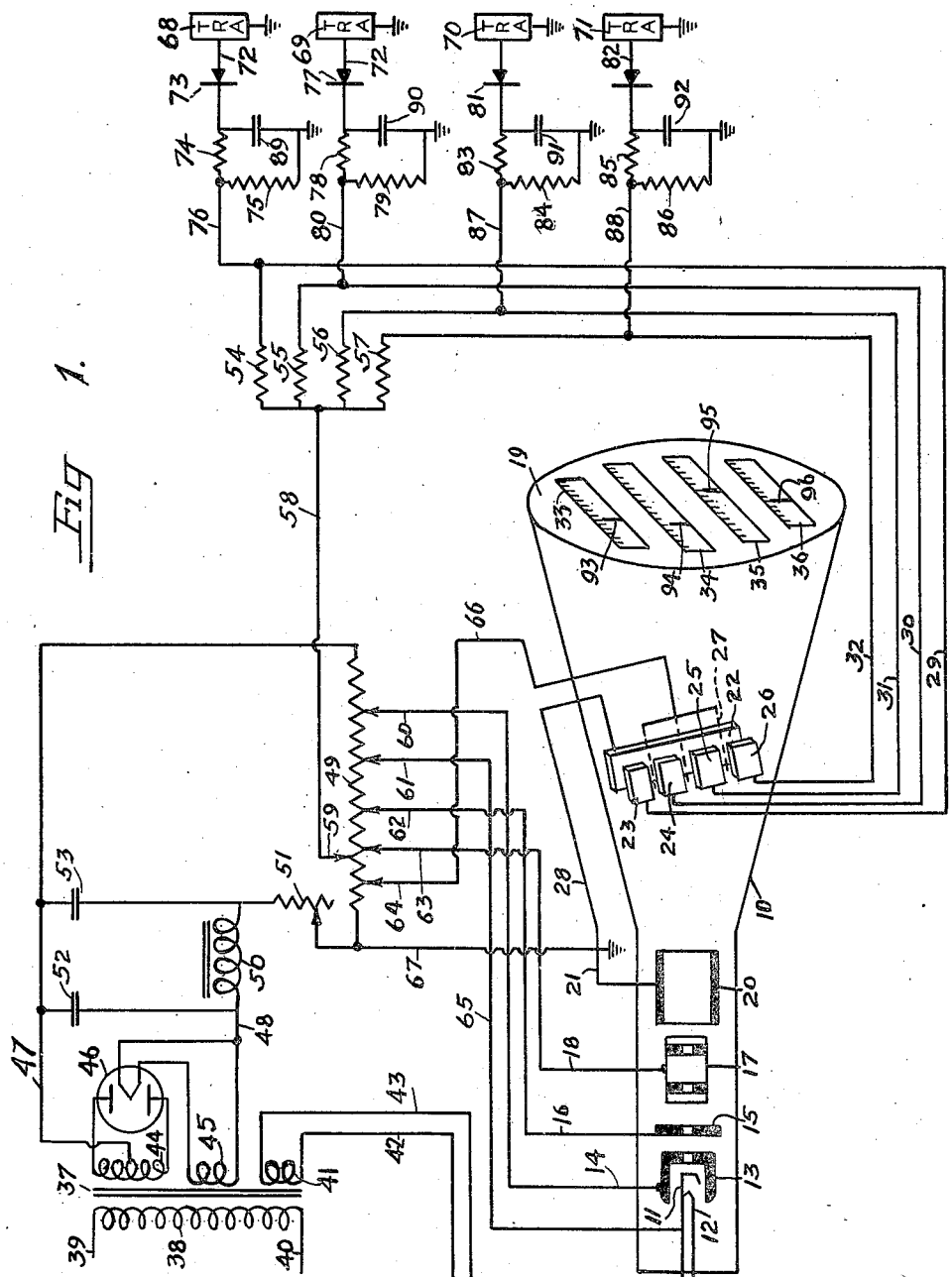
Inventor
HARRY C. MORGAN.
by Charles W. Hills Attys

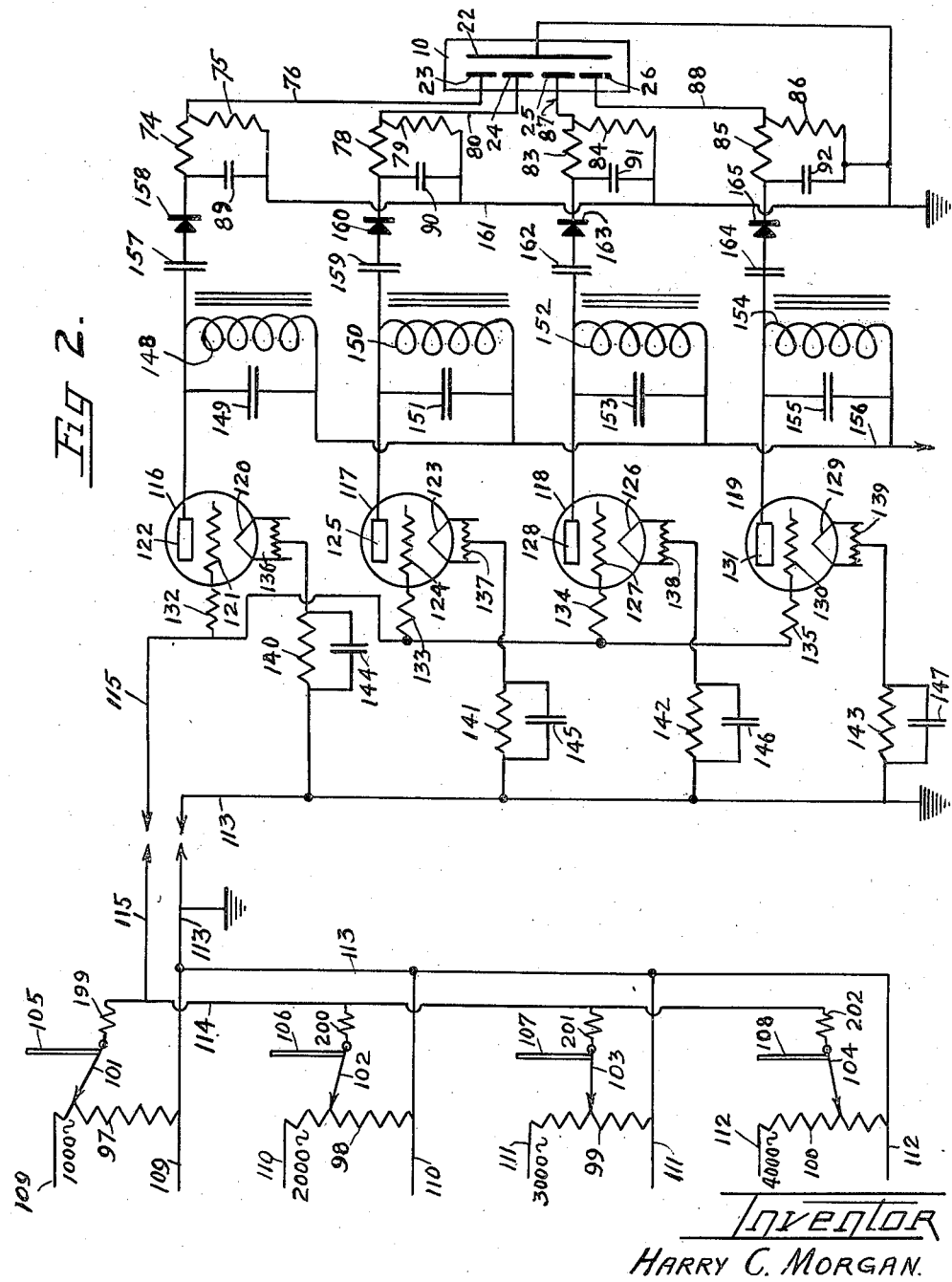

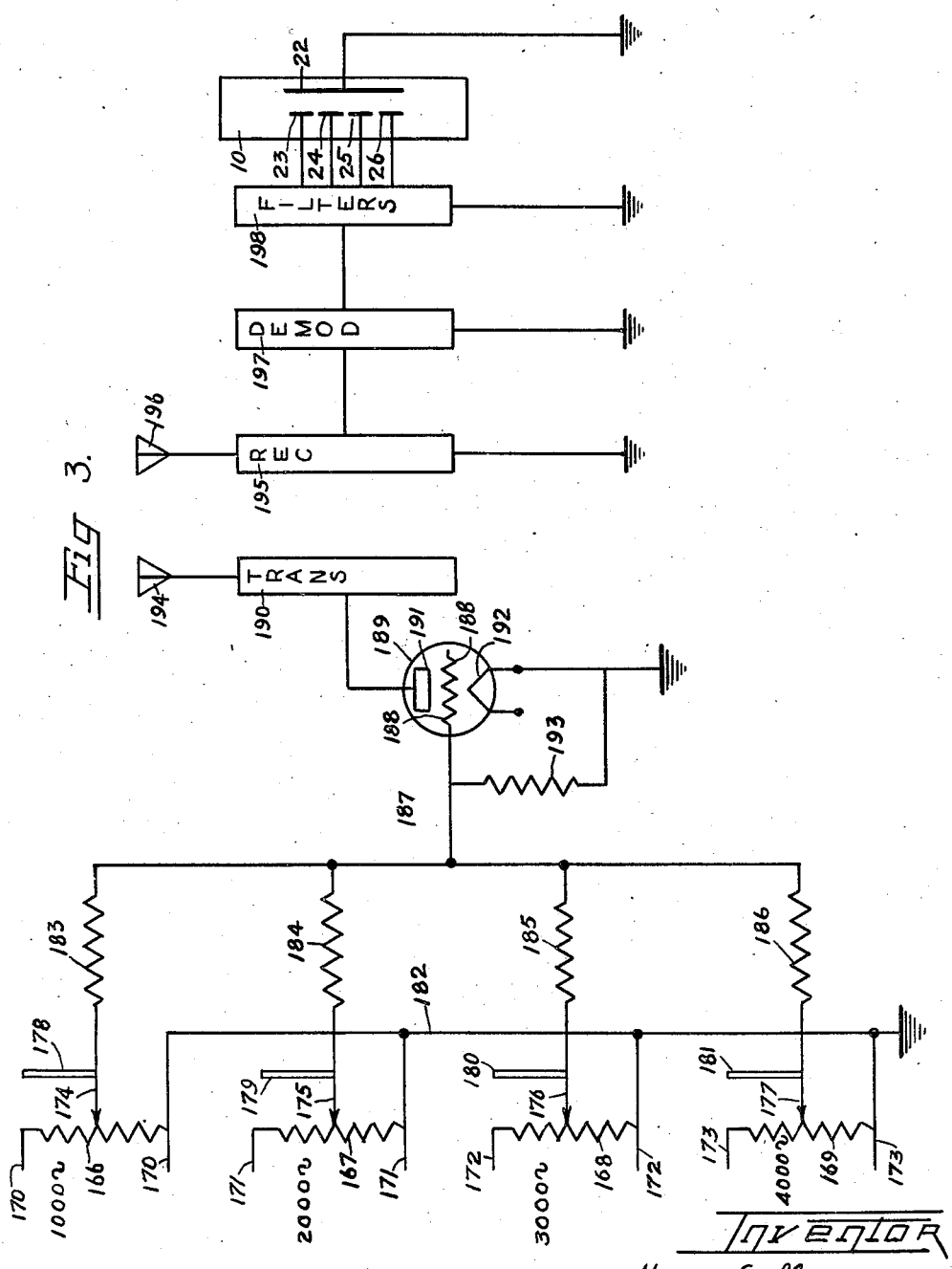

Patented Feb. 5, 1946

2,394,196

UNITED STATES PATENT OFFICE 2,394,196

MULTISCALE INSTRUMENT INDICATING SYSTEM

Harry C. Morgan, Dayton, Ohio, assignor, by mesne assignments, to Curtis Engineering Company, Inglewood, Calif., a copartnership consisting of William H. Curtis and Russell R. Curtis Application July 9, 1943, Serial No. 493,986

13 Claims. (Cl. 177—351)

This invention relates to a multi-scale instrument indicating system.

In the operation of air-craft, sea-going craft of various kinds, and other kinds of mobile and stationary equipment where a multiplicity of instruments are used to register the operation of the equipment, it has been the practice in the past to mount the many instruments on a panel in front of the operator. This requires the operator to visually scan the panel at frequent intervals, reading various gauges, instruments, etc. With the advent of multi-motored equipment, as well as with the increase in the number of additional accessories, the number of instruments mounted on the panel has materially increased. As a result, the operator's responsibility has increased proportionately.

The present invention relates to means for simplifying the operator's task of observing performance, and to reducing the panel space required for registration of various necessary readings.

The present invention relates to apparatus which includes a plurality of translators which vary an electrical output, or signal, in accordance with the variation of the quantity being measured, such as speed, pressure, temperature or other functional operation being quantitatively measured, and an interpreter for interpreting and registering the electrical response of each individual translator in a confined locality where it can be observed by the operator. More particularly, it relates to a single indicating instrument and its associated apparatus and circuit, which instrument is provided with a multiplicity of scales which serve to provide a multiplicity of indications corresponding with a like number of conditions being registered.

The present invention is an improvement over my copending application entitled "Multiple-scale, multiple function instrument indicating system," U. S. Serial No. 486,410, filed May 10, 1943, wherein the broad aspects of such a system are described and claimed.

It is an object of the present invention to provide a novel multiple scale instrument indicating system.

It is a further object of the present invention to provide a novel method and means for connecting the interpreters to the translator.

Another object of the present invention is to provide a novel circuit arrangement wherein all of the translating means are connected to the interpreter through a single pair of conductors.

Still another object of the present invention is to provide a plurality of translators, each having a separate source of low frequency different from one another, which are transmitted over a common channel to a receiving point where they are separated and fed to the interpreter.

A still further object of the present invention is to provide a multiple-scale instrument indicating system wherein the indications from the plurality of translators are transmitted by a high frequency carrier to a receiving point where they are separated and applied to the interpreter means.

The novel features which I believe to be characteristic of my invention are set forth with particularity in the appended claims. The invention itself, however, both as to its organization, manner of construction and method of operation, together with further objects and advantages thereof, may best be understood by reference to the following description taken in connection with the accompanying drawings, in which:

Figure 1 is a schematic wiring diagram illustrating a portion of a multi-scale instrument indicating system which includes the interpreter and the means for energizing the same;

Figure 2 is a schematic wiring diagram of a portion of a multi-scale instrument indicating system which includes a plurality of translators, the receiving means for segregating the various indications from the various translators, and the interpreter; and Figure 3 is a schematic diagram of a modified form of the present invention wherein the various indicators from the translator are transmitted by a high frequency carrier to the interpreter.

In Figure 1 of the drawings there is diagrammatically illustrated the principal component parts of the interpreter and the energizing circuit therefor, of a multi-scale instrument indicating system. More particularly, an interpreter is shown in the form of a specially designed cathode ray tube 10. The novel features of this particular cathode ray tube are described in detail and claimed in my copending application Serial No. 486,410 hereinbefore referred to. This cathode ray tube 10 is provided with a cathode 11 which is indirectly heated by a filament 12. Adjacent the cathode 11 is a control grid 13 which is adapted to regulate the number of electrons in the sheet drawn from the cathode 11. This control grid 13 is provided with a suitable negative biasing potential through a conductor 14. Next to the control grid 13 is an accelerating anode 15 which is provided with a sufficiently high positive biasing potential through conductor 16 to cause a sheet of electrons to be drawn from the cathode 11.

Disposed beyond the accelerating anode 15 is a focusing electrode 17 which is provided with a positive bias through conductor 18. This focusing electrode 17 is arranged in such a manner that the line formed, when the electron beam strikes the fluorescent screen 19 in the enlarged end of the tube 10, will be focused to the desired width. A second accelerating anode 20 is disposed adjacent the focusing electrode 17 and receives its biasing potential through conductor 21.

Disposed beyond the second accelerating electrode 20 is a deflector plate 22 and a plurality of deflector plates 23, 24, 25 and 26. The deflector plates 23 to 26 in conjunction with the deflector plate 22, are arranged to deflect segments of the sheet of electrons in response to changes in the electric biasing potentials applied to them. A Faraday electrostatic screen 27 is provided to isolate the various deflector plates 22 to 26 from one another. Deflector plate 22 is connected to ground through conductor 28 as well as to conductor 21 from second accelerating anode 20 which is also grounded. Deflector plates 22 to 26 receive their variable biasing potentials through conductors 29 to 32 respectively in a manner presently to be described.

From the above description it will be apparent to those skilled in the art that any one of the deflector plates 23 to 26 can cause a portion or segment of the sheet of electrons passing between the deflecting plates 23 to 26 and the deflector plate 22, to be deflected, thereby causing that segmental portion of the sheet of electrons to strike the fluorescent screen 19 at a different point therealong. It will thus be apparent that while only a single cathode ray tube is employed, and that while only a single electron emitting source is provided; nevertheless, a plurality of indications is obtained simultaneously on the fluorescent screen 19 along suitable scales 33 to 36, depending upon the respective biasing potentials impressed on the various deflector plates 22 to 26. This enables a multi-scale, multi-function instrument to be provided with a single cathode ray tube having a single electron emitting source.

The necessary biasing potential for the cathode ray tube 10 is obtained from a full wave rectifier comprising a transformer 37 having a primary winding 38 arranged to be connected to a suitable source of alternating current through conductors 39 and 40. The transformer 37 is provided with a filament heating winding 41 which is connected through conductors 42 and 43 to filament 12 of the cathode ray tube 10. Secondary windings 44 and 45 in conjunction with a rectifier tube 46 provide a conventional full wave rectifier for supplying high voltage direct current to the cathode ray tube 10. The output circuit of the full wave rectifier includes conductors 47 and 48. Conductor 47 is connected to one end of a voltage divider potentiometer 49 and conductor 48 is connected through a choke 50 and a rheostat 51 to the other end of the voltage divider potentiometer 49. A pair of filter condensers 52 and 53 are provided in the output circuit.

The voltage divider potentiometer 49 is so designed and arranged that with all measured apparatus shut off, all indicating lines on the fluorescent screen 19 of the cathode ray tube 10 can be adjusted to the zero point at one end of each of the scales 33 to 36. The deflector plates 23 to 26 are each connected by their associated conductors 29 to 32 respectively through isolating resistors 54 to 57 respectively and common conductor 58 to the movable contact 59 on the voltage divider potentiometer 49. These isolating resistors 54 to 57 are of relatively high ohmic value, such, for example, as one million ohms each. These isolating resistors are arranged to prevent changing potentials in one of the deflector plates 22 to 26 from influencing the remaining deflector plates of that group. The voltage divider potentiometer is also provided with movable contacts 60, 61, 62, 63, and 64. A movable contact 60 is connected through conductor 14 to the control grid 13. Movable contact 61 is connected through a conductor 65 to cathode 11. Movable contact 62 is connected through conductor 16 to the first accelerating anode 15. Movable contact 63 is connected through conductor 18 to the focusing electrode 17. Movable contact 64 is connected through a conductor 66 to the Faraday electrostatic screen 27. The left hand end of the voltage divider potentiometer 49 is connected through a conductor 67 to conductors 21 and 28 which in turn are connected to the second accelerating anode 20 and deflector plate 22 respectively. This conductor 67 is also grounded as shown.

The right hand portion of Figure 1 illustrates how the various translators may be connected to the cathode ray tube 10. The translators are diagrammatically indicated by the reference characters 68, 69, 70 and 71. As will presently be described in connection with Figures 2 and 3 of the drawings, the translators are arranged to apply an alternating current biasing potential proportional to the conditions being registered. The alternating current biasing potential for translator 68 is fed through a conductor 72 and a rectifier 73 to a pair of resistors 74 and 75 connected in series, the return circuit being through ground as indicated. It will thus be apparent that a voltage drop occurs across the resistors 74 and 75 which is proportional to the output voltage of the translator 68. The midpoint between resistors 74 and 75 is connected through a conductor 76 and conductor 29 to deflector plate 23. The output of translator 69 is similarly connected through a rectifier 77 to two series connected resistors 78 and 79, the midpoint of which is connected through conductor 80 and conductor 30 to deflector plate 24 of the cathode ray tube 10. The output of translators 70 and 71 are similarly connected to rectifiers 81 and 82 to a pair of resistors 83 and 84 and a second pair of resistors 85 and 86 respectively in the manner shown. The midpoint between resistors 83 and 84 is connected through a conductor 87 and conductor 31 to deflector plate 25, while the midpoint between resistors 85 and 86 is connected through a conductor 88 and conductor 32 to deflector plate 26 of the cathode ray tube 10.

Filter condensers 89 to 92 are preferably provided in the output circuit of each of the translators 68 to 71 respectively to keep all alternating current out of the resistors 74, 75, 78, 79, 83, 84, 85 and 86.

From the above description it will be understood that the respective positions of the various segmental portions of the sheet of electrons striking the fluorescent screen 19 and the cathode ray tube 10 depend upon the particular biasing voltage applied on the deflector plates 23 to 26. The particular segmental portions of the sheet of electrons associated with each of the scales 33 to 36 are indicated by the reference characters 93, 94, 95 and 96 respectively. The relative position of each of these segmental portions of the sheet of electrons will change as the biasing potential on the deflector plates 23 to 26 change in response to changes in the value of the conditions being measured by the translators 68, 69, 70 and 71.

In Figure 2 of the drawings there is illustrated a system in which a plurality of different low frequency oscillations, one associated with each condition to be measured, are provided. The amplitude of the low frequency oscillation varies in response to the condition to be measured and all indications are fed over a single pair of transmitting conductors to the locality of the interpreter where the low frequency oscillations are segregated and rectified. The rectified output of each segregated low-frequency oscillation is supplied to one of the deflector plates of the cathode ray tube 10 which has been described in detail in connection with Figure 1.

Referring now to the specific apparatus shown, four resistors, 97, 98, 99 and 100, each of which has an associated movable contact 101, 102, 103 and 104 respectively are arranged to be actuated by movable elements 105, 106, 107 and 108 respectively, the movement of which is responsive to the intensity or amplitude of value of the condition being measured. Isolating resistors isolate the various resistors 97, 98, 99 and 100 from variations of position of each other. Resistor 97 is connected to some suitable source of low frequency oscillation, such, for example, as a one thousand cycle source, through conductor 109. Resistor 98 is connected, through conductor 110, to another source of low frequency oscillation having a different frequency than that to which resistor 97 is connected, such, for example, as a source having a two thousand cycle frequency. Resistor 99 is connected through conductor 111 to still another source of low frequency oscillation having a frequency, such, for example, as three thousand cycles per second. Resistor 100 is connected through conductor 112 to a fourth source of low frequency oscillation, such, for example, as a source of four thousand cycles per second.

The lower end of each of the resistors 97 to 100 is grounded through a conductor 113. The movable contact elements 101 to 104 are each connected to a common conductor 114; through isolating resistors 199, 200, 201 and 202; which in turn is connected to the transmitting conductor 115. These isolating resistors 199 to 202 isolate the various resistors 97 to 100 from variations in the position of each other.

From the above it will be apparent that the output of the various low frequency sources are fed into the common transmission line composed of conductors 115 and 113. In proximity to the cathode ray tube interpreter 10; which for purposes of simplicity is diagrammatically illustrated by showing the large deflector plate 22 and the smaller confronting deflector plates 23 to 26; four triodes 116, 117, 118 and 119 are provided. The vacuum tube triode 116 includes a filament 120, a control grid 121 and a plate 122. Triode 117 includes a filament 123, a control grid 124 and a plate 125. Triode 118 includes a filament 126, a control grid 127 and a plate 128. Triode 119 includes a filament 129, a control grid 130 and a plate 131.

Transmission line conductor 115 is connected to control grids 121, 124, 127 and 130 through isolating resistors 132, 133, 134 and 135 respectively. The filament heating current supplied is not shown but it is to be understood that the filament of each of the triodes 116 to 119 is heated in a conventional manner. Resistors 136, 137, 138 and 139 are connected across filaments 120, 123, 126, and 129 respectively. The midpoint of each of these resistors 136 to 139 are connected through self biasing resistors 140, 141, 142 and 143 to the grounded transmission conductor 113. By-pass condensers 144, 145, 146 and 147 are connected across resistors 140 to 143 respectively.

A resonant filter is provided in the output circuit of each of the triodes 116 to 119 so that the output circuit of one triode is tuned to a thousand cycles, a second triode is tuned to two thousand cycles, a third to three thousand cycles and a fourth to four thousand cycles. These resonant filters are diagrammatically illustrated by an inductance element and a condenser element. More particularly, the output circuit of triode 116 is provided with a resonant filter including an inductance element 148 and a condenser 149, the latter being connected in parallel with the former. The output circuit of triode 117 is provided with a resonant filter tuned to two thousand cycles which includes inductance element 150 and condenser 151. The output circuit of triode 118 includes a resonant filter tuned to three thousand cycles having an inductance element 152 and a condenser 153. The output circuit of triode 119 is provided with a resonant filter tuned to four thousand cycles which includes an inductance element 154 and a condenser 155. Positive biasing potential for the plates 122, 125, 128 and 131 of triodes 116 to 119 is provided through conductor 156 which is connected to a suitable source of positive biasing potential (it being understood that the low voltage side of the potential source is grounded). Positive biasing potential is received on plate 122 through conductor 156 and inductance element 148. Positive biasing potential is received on plate 125 through conductor 156 and inductance 150. Plates 128 and 131 similarly receive their positive biasing potential through conductor 156 and inductances 152 and 154 respectively.

One thousand cycle current is fed by resonant filter 148, 149 through a coupling condenser 157 to rectifier 158. This rectifier 158 is diagrammatically illustrated as being of the dry disk type but may, of course, be of any suitable variety which will rectify the low frequency current impressed thereon. The rectified current which passes through rectifier 158 to load resistors 74 and 75 has previously been described in connection with Figure 1. The midpoint between resistors 74 and 75 is connected through conductor 76 to deflector plate 23 of the cathode ray tube 10. It will thus be apparent that the magnitude of the biasing potential on deflector plate 23 will be directed proportional to the amplitude of the voltage wave of the thousand cycle low frequency oscillation transmitted over conductors 115 and 113.

The two thousand cycle resonant filter 150, 151 is connected through a coupling condenser 159 to a rectifier 160, preferably of the dry disk type. The rectified current passing through rectifier 160 is fed through load resistors 78 and 79 to ground, through conductor 161. The midpoint between resistors 78 and 79 is connected through conductor 80 to deflector plate 24 which has previously been described in connection with Figure 1. It will thus be apparent that the biasing potential on deflector plate 24 will be proportional to the amplitude of the voltage wave of the two thousand cycle current transmitted over conductors 115 and 113.

Resonant filter 152, 153 is connected through a coupling condenser 162 to a rectifier 163. The rectified current passing through rectifier 163 is fed through load resistors 83 and 84 to the grounded return conductor 161. The midpoint between resistors 83 and 84 is connected through conductor 87 to a deflector plate 25 as has been described in connection with Figure 1. It will thus be apparent that the magnitude of the biasing potential on the deflector plate 25 will be proportional to the amplitude of the voltage wave of the three thousand cycle current supplied through transmitting conductors 115 and 113.

Resonant filter 154, 155 is connected through a coupling condenser 164 to a rectifier 165. The rectified current passing through rectifier 165 is fed through load resistors 85 and 86 to the grounded return conductor 161. The midpoint between resistors 85 and 86 is connected through conductor 88 to deflector plate 26 as has been described in connection with Figure 1. It will thus be apparent that the magnitude of the biasing potential on deflector plate 26 is proportional to the amplitude of the voltage wave of the four thousand cycle current supplied through conductors 115 and 113.

It will be further apparent that all of the indicating signals from the various translators are fed through a single pair of conductors. Due to the filter networks and due to the fact that a different low frequency is associated with each translator, it will be apparent that variations in the amplitude of the voltage wave from one translator will not interfere with the transmission of signals from the other translators, even though they all be fed into a single pair of transmission conductors 115 and 113.

In Figure 3 of the drawings a modified form of the invention is diagrammatically illustrated. More particularly, Figure 3 shows an arrangement in which the various low frequency currents coming from the different translators modulate a high frequency carrier wave which is then transmitted to a radio frequency receiving station where the modulated carrier wave is received, demodulated, filtered, rectified and fed to the interpreter tube. More particularly, the system shown in Figure 3 includes four potentiometers or voltage dividers 166, 167, 168 and 169. These potentiometers are connected to different sources of low frequency alternating current. For example, potentiometer 166 is connected through conductor 170 to a source of one thousand cycle alternating current. Potentiometer 167 is connected through conductor 171 to a source of two thousand cycle alternating current. Potentiometer 168 is connected through conductor 172 to a three thousand cycle source of alternating current. Potentiometer 169 is connected through conductor 173 to a four thousand cycle source of alternating current. Each potentiometer or voltage divider element 166 to 169 is provided with a movable contact element 174 to 177 respectively, which movable contact elements are moved by an associated mechanism diagrammatically illustrated by the rods 178 to 181 respectively. It is to be understood that these rods 178 to 181 are arranged to be moved amounts proportional to the condition being measured. The lower end of each voltage divider element 166 to 169 is connected to a grounded conductor 182. Movable contact elements 174 to 177 are connected through resistors 183 to 186 respectively, which in turn are all connected to a single conductor 187. Thus the voltages taken from the various voltage dividers 166 to 169 are all impressed on the grid 188 of a modulator tube 189 of a radio transmitter 190. The modulator tube is illustrated, for purposes of simplicity, as a triode having an anode 191, a control grid 188 and a filament 192. A biasing resistor 193 is provided between the grid 188 and the filament 192. The filament heating circuit is not shown but it will be understood that this may be of any conventional design. The output of the radio transmitter is fed to an antenna which is diagrammatically illustrated at 194.

A radio receiver 195 is provided which is connected to a receiving antenna 196 to pick up the signals transmitted from the antenna 194. This receiver 195 may be of any conventional design with radio frequency amplification and automatic volume control. The output of the radio frequency amplifier 195 is fed to a detector or demodulator 197. The output of the demodulator 197 is thus a complex wave which is a combination of the four low frequency waves sent out from the four translators. The output of the demodulator 197 is fed to a group of resonant filters and rectifiers as diagrammatically illustrated at 198. These may be generally of the type which has previously been described in connection with Figure 2 of the drawings. The output from the various resonant filters 198 are fed to associated deflector plates 23 to 26 of the interpreter tube 10.

In connection with this system it will be understood that the magnitude of the carrier wave is the full scale deflection magnitude reference. The percentage of modulation of the thousand cycle, two thousand cycle, three thousand cycle and four thousand cycle current applied to the carrier determines the amount of deflection on the fluorescent screen of the cathode ray tube 10.

The resistors 183 to 186 which are connected between the voltage divider elements 166 to 169 in the grid 188 are isolating resistors and serve to prevent interference between the various translators.

While I have shown particular embodiments of my invention, it will, of course, be understood that I do not wish to be limited thereto, since many modifications may be made, and I therefore contemplate, by the appended claims, to cover all such modifications as fall within the true spirit and scope of my invention.

I claim as my invention:

1. A multi-scale instrument indicating system comprising a plurality of condition determining devices, each having means for supplying a different predetermined low frequency oscillation and only one of said low frequency oscillations being associated with each of said condition determining devices, means for changing the condition of each of said low frequency oscillations as a function of the condition being measured, a single cathode ray tube having a plurality of scales on a fluorescent screen contained therein, means for producing a single stream of electrons within said tube which impinge on the scale portions of said screen and which electrons are arranged to excite a local area on each scale portion, and means for independently varying the position where said electrons impinge on each scale portion as a function of the modified low frequency oscillations.

2. A multi-scale instrument indicating system comprising at least three condition determining devices, each having means for supplying a low frequency oscillation of a frequency different than that of the remaining ones and only one of said low frequency oscillations being associated with each of said condition determining devices, means for independently varying the amplitude of each of said low frequency oscillations as a function of the respective conditions being measured, one low frequency oscillation being associated with each condition to be measured, a single cathode ray tube having a plurality of scales on a fluorescent screen contained therein, means for producing a single stream of electrons within said tube which impinge on the scale portions of said screen and which electrons are arranged to excite a local area on each scale portion, and continuously excited means for varying the position where said electrons impinge on each scale portion as a function of the intensity of said low frequency oscillations and independently of each other, each of said low frequency oscillations having a different scale associated therewith.

3. A multi-scale instrument indicating system comprising a plurality of condition determining devices, each having means for supplying a different predetermined low frequency oscillation and only one of said low frequency oscillations being associated with each of said condition determining devices, means for changing the condition of each of said low frequency oscillations as a function of the condition being measured, a radio transmitter including means for transmitting a high frequency carrier, means for modulating said carrier with all of said low frequency oscillations, means for receiving and demodulating said complex modulated carrier, filter means for segregating the demodulated low frequency oscillations, means for rectifying said demodulated low frequency oscillations, a single cathode ray tube having a fluorescent screen with a plurality of scale portions thereon, one for each condition determining device, means for producing a single stream of electrons which impinge on a local area of said scale portions of said screen, and form an indicating indicia, a plurality of electron stream deflecting means within said tube for varying the place where the electrons impinge on each scale portion, there being a separate means for each scale, each of said means being continuously energized and varied independently as a function of a different one of said rectified demodulated low frequency oscillations.

4. A multi-scale instrument indicating system comprising a plurality of condition determining devices, each having means for supplying a different predetermined low frequency oscillation and only one of said low frequency oscillations being associated with each of said condition determining devices, the amplitude of which is a function of the condition being measured, a receiving station, means for transmitting said oscillation by a common carrier to said receiving station, said receiving station including means for segregating and rectifying said oscillations, a single cathode ray tube arranged to project a sheet of electrons on a fluorescent screen contained therein, said cathode ray tube including separate electron deflecting means for each of said condition determining devices for controlling the deflection of said different segmental portions as a function of the biasing potential on said last means, and means for continuously supplying biasing potentials to each of said last means independently of each other and which are proportional to the amplitude of the rectified outputs of said received oscillation, whereby the position of each segmental portion where it strikes said screen is a function of its associated condition determining device.

5. A multi-scale instrument indicating system comprising a plurality of condition determining devices, a corresponding number of translators, each of said translators including means for supplying a different identifying low frequency signal, the intensity of which is proportional solely to the value of the condition being determined by its single associated condition determining device, a single cathode ray tube indicator having a fluorescent screen with a plurality of indicating scale portions, one for each translator, said tube having means for projecting a stream of electrons against said screen and arranged to locally excite a portion of said screen portions, means for independently deflecting the electrons striking each scale portion therealong as a function of the intensity of each of said scale's associated low frequency oscillation.

6. A multi-scale instrument indicating system comprising a plurality of condition determining devices, a corresponding number of translators, each of said translators including means for supplying a different identifying low frequency signal, the intensity of which is proportional solely to the value of the condition being determined by its single associated condition determining device, a single cathode ray tube indicator having a fluorescent screen with a plurality of indicating scale portions, one for each translator, said tube having means for projecting a stream of electrons against said screen and arranged to locally excite a portion of each of said scale portions, means for feeding all of said low frequency signals through a single common channel, means for receiving and segregating the low frequency signals so fed through said common channel, separate means independently of each other for deflecting the electrons striking each scale portion therealong, and means for energizing each of said separate deflecting means as a function of one of said received low frequency signals.

7. A multi-scale instrument indicating system comprising a plurality of condition determining devices, a corresponding number of translators, a single interpreter having a plurality of indicating scales and an indicating means associated with each scale to register the value of the condition being determined, each of said translators having means for supplying a single identifying signal different from all other identifying signals, the intensity of which is a function of the condition being measured, and means for moving each of said indicating means as a function of the intensity of its associated identifying signal, each moving means being unaffected by the condition of all the other moving means.

8. A multi-scale instrument indicating system including a plurality of translators, a single interpreter having a plurality of indicating scales, and an indicating means associated with each scale, each of said translators having means for supplying a single identifying low frequency signal different from all other identifying signals whose intensity is arranged to vary, and means for independently moving each of said indicating means as a function of the intensity of its associated low frequency signal.

9. A multi-scale instrument indicating system including a plurality of translators, a single interpreter having a plurality of indicating scales, and an indicating means associated with each scale, each of said translators having means for supplying a different identifying low frequency signal whose intensity is arranged to vary, a pair of conductors, a plurality of isolating resistors, means for feeding each of said low frequency signals through one of said isolating resistors to and over said pair of conductors, filter means for segregating said low frequency signals transmitted over said pair of conductors, and means for moving each of said indicating means independently of each other as a function of the intensity of a different one of said received low frequency signals.

10. A multi-scale instrument indicating system including a plurality of translators, a single interpreter having a plurality of indicating scales, and an indicating means associated with each scale, each of said translators having means for supplying a different identifying low frequency signal whose intensity is arranged to vary, a pair of conductors, a plurality of isolating resistors, means for feeding each of said low frequency signals through one of said isolating resistors to and over said pair of conductors, filter means for segregating said low frequency signals transmitted over said pair of conductors, means for rectifying each of the segregated received low frequency signals, and means for deflecting each of said indicating means as an independent function of the intensity of its associated rectified low frequency signal.

11. A translating circuit for a multiple scale instrument indicating system comprising a plurality of sources of alternating current, each source having a different frequency, the voltage of which is a function of a condition to be indicated, means for mixing said alternating currents and sending them over a common channel, a plurality of vacuum tubes, each having a cathode, an anode and a control electrode, means connecting said common channel across the control electrode and the cathode of each tube, means for giving the anode of each tube a positive bias, a filter network connected in the output circuit of each tube, each filter network being arranged to pass a different one of said frequencies, and means for applying the potential of each alternating current passed by each of said filters to an indicating instrument.

12. A translating circuit for a cathode ray tube indicating instrument of the type having a plurality of control electrodes electrostatically shielded from each other comprising a plurality of sources of alternating current energy, each source having a different characteristic frequency, the voltage of which is a function of a condition to be indicated, means for transmitting said different energy waves simultaneously over a common channel, a plurality of electron discharge devices each having a cathode, an anode and a control electrode, means connecting said common channel across the control electrode and the cathode of each of said electron discharge devices, means for impressing a positive biasing potential on each anode, means for segregating a different one of the characteristic frequencies in the output circuit of each electron discharge device, the output of each of said segregating means being thus arranged to pass a different one of said characteristic frequencies, and means for applying the potential of each of the different characteristic frequency waves to separate one of said control electrodes of said cathode ray tube.

13. A translating circuit for a cathode ray tube indicating instrument of the type having a plurality of control electrodes electrostatically shielded from each other comprising a plurality of sources of alternating current energy, each source having a different characteristic frequency, the voltage of which is a function of a condition to be indicated, means for transmitting said different energy waves simultaneously over a common channel, a plurality of electron discharge devices each including an anode, a cathode and a control grid, a plurality of resistance elements of relatively high ohmic value each connected at one end to a different one of said control grids and at the other end to one side of said common channel, each cathode having a self-biasing resistor and capacitor connecting it to the other side of said common channel and ground, a plurality of parallel resonant filter networks including an inductance element and a capacity element connected in parallel, one side of each of said parallel resonant networks being connected to a different one of said anodes and the other side being connected to a common source of anode biasing potential, each filter network being tuned to a different one of said characteristic frequencies, a resistance load for each characteristic frequency, reactifying means connecting each filter network to said resistance load, and means for deriving a biasing potential from each resistance load for a different one of said control electrodes of said cathode ray tube whereby the different biasing potentials on the different control electrodes of said cathode ray tube are independently a function of the relative values of the different characteristic alternating potentials of said sources.

HARRY C. MORGAN.